Nov. 25, 1947.  P. K. CHATTERJEA ET AL  2,431,305
RADIO LOCATING ARRANGEMENTS
Filed June 24, 1943
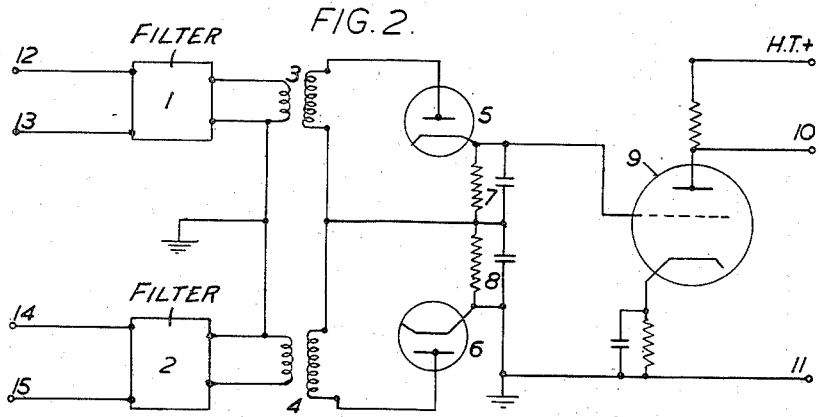
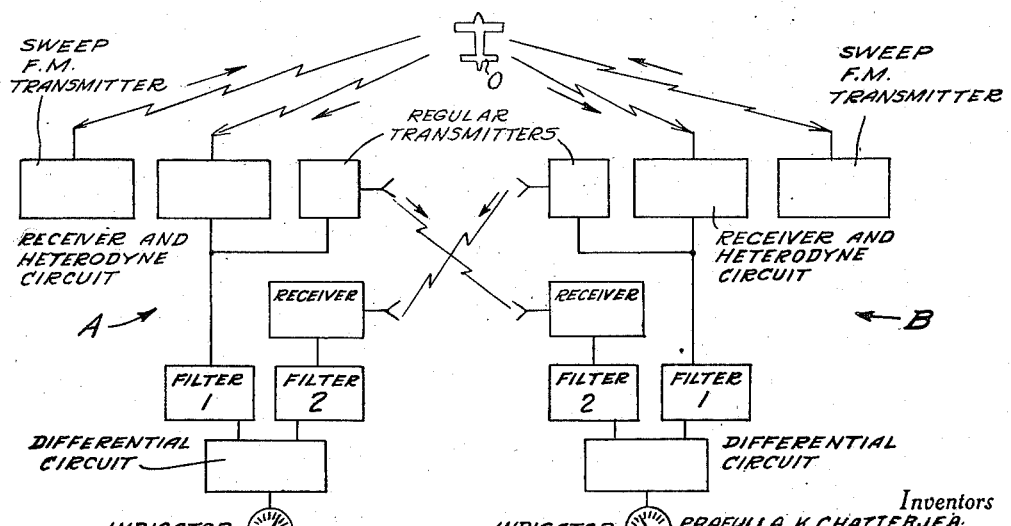
Inventors
PRAFULLA K. CHATTERJEA.
LESLIE WILFRED HOUGHTON
By
Edward D. Phinney
Attorney Patented Nov. 25, 1947

2,431,305

UNITED STATES PATENT OFFICE 2,431,305

RADIO LOCATING ARRANGEMENTS

Prafulla Kumar Chatterjea and Leslie Wilfred Houghton, London, England, assignors to Standard Telephones and Cables Limited, London, England, a British company Application June 24, 1943, Serial No. 492,080
In Great Britain July 17, 1942

8 Claims. (Cl. 250—1.70)

1

The present invention relates to radio locating arrangements and has for its object to provide arrangements for giving indications for directing two or more mobile units, hereinafter called chaser units, towards another mobile unit, hereinafter called a chased unit. The chased unit may be, for instance, an enemy vessel at sea, or an enemy aircraft sought by an allied vessel or aircraft. Each of the chaser units is provided with radio means for determining the distance between said chaser unit and the chased unit in terms of a frequency. Such means are now well known in the art and in particular means utilising the known frequency sweep method or electric pulse method may be used since such means give directly a frequency representative of the distance between the chaser unit and the chased unit.

In arrangements utilising the frequency sweep method of distance determination, a carrier frequency is transmitted and is cyclically frequency-modulated over a frequency range or sweep at a number of cycles per second. The waves after reflection from the chased unit are received and heterodyned with the contemporaneously transmitted waves in order to obtain the difference frequency. This difference frequency is representative of the distance between the transmitter and the chased unit. In the pulse arrangement the repetition frequency of the pulses is adjusted until a transmitted and received pulse coincide. In this type of circuit the pulses will have to be repeated at slower frequencies as the distance increases, in order to make a transmitted and a received pulse coincide. It is considered that no further description of these arrangements is necessary herein.

According to one aspect of the present invention arrangements for indicating the relative positions of two or more mobile chaser units with respect to a mobile chased unit, each chaser unit being provided with radio means for determining the distance between said chaser unit and the chased unit in terms of frequency, are characterised in this that each chaser unit is also provided with means for transmitting said frequency to the other chaser units, with means for determining the difference frequency between the frequency representing its own distance from the chased unit and the frequency received from one of the other chaser units, and with means for utilising said difference frequency to obtain an indication as to which direction the chaser unit should proceed

2 in so that said difference frequency will be reduced toward zero.

According to another aspect of the invention arrangements for indicating the direction to two or more mobile chaser units towards a mobile chased unit, each chaser unit being provided with radio means for determining the distance between said chaser unit and chased unit in terms of a frequency, is characterised in this, that at least two of said chaser units are provided with means for transmitting said frequency to the other chaser units, and each chaser unit is provided with means for determining the difference frequencies between the frequency representing its own distance from said chased unit and the said transmitted frequencies from at least two of the chaser units and with means for utilising said difference frequencies to obtain automatically an indication as to in which direction the chaser unit should proceed so that said difference frequencies will be reduced toward zero.

It will be realised that the arrangements may be continuously operating, in which case a continuous indication for directing of the chaser aircraft towards the chased aircraft would be obtained, or the arrangements may work intermittently.

The invention will be better understood from the following description taken in conjunction with the accompanying drawings in which:

Fig. 1 is an explanatory diagram;

Fig. 2 shows diagrammatically arrangements for obtaining an indication on the chaser units of the direction in which the unit should proceed so that the difference between the frequencies representing the distances of two chaser aircraft from the chased aircraft will be reduced towards zero; and Fig. 3 is a characteristic curve of the filters used in the arrangements shown in Fig. 2.

Fig. 4 is a block diagram illustrating a complete system embodying the invention.

Referring to the drawings consider the case of two mobile locators A and B (Fig. 1) for example, two fighter aircraft which are able to determine the distance away of the located object O (Fig. 1) in terms of a frequency. If OA is longer than OB when the frequency indication of locator A say $f_A$ will be lower than that of locator B's indication say $f_B$. It is necessary for automatic action that either A or B or both be able to convert these two relative frequencies into a quantity, such as a voltage, which is capable of giving complete information of required directional changes that should take place in order to cause $f_A$ and $f_B$ to become equal, irrespective of their actual values. A circuit arrangement capable of performing this function is shown in Fig. 2 where 1 and 2 are two identical filters which have characteristics as shown in Fig. 3 and to which the frequencies $f_A$ and $f_B$ are respectively fed. The outputs from 1 and 2 are rectified by two diodes 5 and 6 to which they are fed via transformers 3 and 4. The D. O. outputs from both rectifiers are obtained smoothed out in series opposition across resistance-condenser networks 7 and 8 and the difference voltage is fed to the grid of a valve amplifier 9, the required output then being obtained between terminals 10 and 11.

Suppose $f_A$ be fed to terminals 12 and 13, and $f_B$ to terminals 14 and 15 after having been corrected if necessary to the same amplitude, then depending upon their value of frequency, the output amplitudes from the filters 1 and 2 will be modified. If $f_A$ is the higher frequency it will have the higher output amplitude when applied to rectifier 5, than $f_B$ which is simultaneously applied to rectifier 6, so that a relatively larger D. C. voltage will be developed across 7 and 8, thus altering the total series voltage across them, and hence the bias of valve 9 so altering the output voltages between terminals 10 and 11.

This voltage variation is then employed to obtain an indication on a voltmeter for example. The voltage above or below that obtained for no difference of potential between the ends of resistances 7 or 8 will give an indication of the direction the aircraft should take towards the chased aircraft. For example, the aircraft B at the greater distance from O will be caused to veer round towards O until the voltage difference between the remote ends of networks 7 and 8 carried by the aircraft B is zero. When the frequency difference is reversed in sign the aircraft A will be further away from O and $f_B$ will be greater than $f_A$ and the voltage across network 8 of the equipment carried by B will be greater than the voltage across network 7 of the same equipment. But the reverse will be the case on aircraft A and hence aircraft A will be directed to veer round towards O. Thus the aircraft A and B are steered alternately, until they have closed in upon the chased aircraft O.

Fig. 4 shows the chased unit at O, and on each side thereof the apparatus which may be carried by the chaser units A and B to enable them to close in on the chased units. This apparatus at A includes a sweep F. M. transmitter, a receiver and heterodyne circuit connected to filter 1 whereby a frequency $F_A$ is supplied to the differential circuit, a receiver connected to filter 2 for receiving a frequency $F_B$ from the regular transmitter of the chaser unit B, a regular transmitter for transmitting the frequency $F_A$ to the chaser unit B, and an indicator connected to the output of the differential circuit supplied from filters 1 and 2. The details of the differential circuit are shown in Fig. 2.

Similar apparatus is shown located on chaser unit B. The regular transmitter at B will transmit a frequency $F_B$ to the receiver and filter 2 on chaser unit A.

The transmitters from A and B radiate a beamed transmission ahead and these beams should be fairly broad with a wide area of overlap.

The carrier frequencies used by the aircraft would of course, have to be different for the two aircraft A and B, and each would have a receiver capable of picking up the transmission from the other directly, for communicating the respective distances from the chased aircraft O.

An indication would, of course, be given to the fighter pilots A and B of the actual distance away of the chased aircraft, for example, a bomber, O, so that when within striking range they would be ready for one to attack direct or ready for the bomber O, if it swung sharply to the right or left so crossing in front of A or B.

If visibility were so bad that the fighters could not see each other, known radio methods would have to be used for keeping the correct relative positions between the aircraft A and B.

Whilst the arrangements according to the present invention have been described assuming the chaser units located in a horizontal plane, it will be clear to those skilled in the art that a similar arrangement may be used by two chaser units in a vertical plane so that a further chaser unit C could co-operate with either or both units A and B to close in on the chased unit O in a vertical direction as well as the horizontal direction. This arrangement in space has the advantage that on contact being made with the bomber, one at least of the fighters will be advantageously placed above the bomber. It will be understood that each chaser unit will transmit its distance frequency on its respective wave length, or else the chasers, when there are several could transmit only during respective successive periods.

Whilst a voltmeter or similar instrument has been indicated as being suitable for the indicating instrument on the chaser unit, it will be understood that other indicating devices such as dial lamps, means for producing a note of the difference frequency or other similar devices may be employed and their adaptation to the present invention will be clear to those skilled in the art.

What is claimed is:

1. Arrangements for indicating the relative positions of a plurality of mobile chaser units with respect to a mobile chased unit, each chaser unit being provided with radio means for determining the distance between said chaser unit and the chased unit in terms of a frequency, characterised in this that each chaser unit is also provided with means for transmitting said frequency to the other chaser units with means for determining the difference between the frequency representing its own distance from the chased unit and the frequency received from one of the other chaser units, and with means for utilising said difference to obtain an indication for the direction in which the chaser unit should proceed so that said difference will be reduced toward zero.

2. Arrangements as claimed in claim 1 characterised in this that said means for determining said difference frequency comprises means for deriving direct current voltages whose values are dependent upon said frequencies, said voltages being applied in opposition to an indicating instrument.

3. Arrangements as claimed in claim 1 characterised in this that the frequency received from one of the other chaser units and the frequency representative of the distance of the chaser unit are passed through respective filters having similar linear characteristics of voltage versus frequency, the outputs from said filters being detected and smoothed and applied in opposition to the control grid of an electron discharge device arrangement, the output of which is applied to an indicating instrument.

4. A system for indicating to a plurality of mobile chaser units, the respective directions to be taken to close in on a mobile chased unit which comprises means for determining the distance of said chased unit from a first of said chaser units, means for determining the distance of said chased unit from a second of said chaser units, means to deliver to said first chaser unit a signal in the form of a voltage corresponding to the algebraic difference between said distances, whereby an indication is provided of the direction in which said first chaser unit must go to reduce said difference to zero, and means to deliver a signal to said second chaser unit signifying a value corresponding to the algebraic difference of said distances, whereby an indication is provided in said second chaser unit of the direction in which said second chaser unit is to go to reduce said difference to zero.

5. A system in accordance with claim 4, in which the means to determine the distance from the chased unit of a chaser unit is located in the particular chaser unit.

6. A system in accordance with claim 4, in which each means to determine the distance between the chased unit and a chaser unit is located in said chaser unit and means to deliver the difference between the distances to each of said chaser units includes means in each chaser unit to transmit information corresponding to the distance of said chaser unit from said chased unit.

7. The method of guiding a plurality of mobile chaser units for closing in on a chased mobile unit which comprises determining the distance of one chaser unit from said chased unit, determining the distance of another chaser unit from said chased unit, taking the algebraic difference of said distances, and producing an indication of direction in each of said chaser units determined by said difference.

8. The method of guiding a pair of mobile chaser units so as to close in on a mobile chased unit which comprises obtaining in each of said chaser units indication of the distance of that chaser unit from said chased unit, transmitting information corresponding to said distance from each of said chaser units to the other, producing in each of said chaser units for use in guiding the chase a visual indication of the magnitude and direction of the algebraic difference of said distances.

PRAFULLA KUMAR CHATTERJEA.
LESLIE WILFRED HOUGHTON.

REFERENCES CITED

The following references are of record in the file of this patent:

UNITED STATES PATENTS

| Number | Name | Date |
|---|---|---|
| 2,268,643 | Crosby | Jan. 6, 1942 |
| 2,268,587 | Guanella | Jan. 6, 1942 |